United States Patent [19]

Colozza

[11] Patent Number: 5,137,331
[45] Date of Patent: Aug. 11, 1992

[54] SEAT TRACK ASSEMBLY WITH MECHANICAL MEMORY

[75] Inventor: Luciano Colozza, Newmarket, Canada

[73] Assignee: Magna International Inc., Markham, Canada

[21] Appl. No.: 620,068

[22] Filed: Nov. 30, 1990

[51] Int. Cl.⁵ ............................................ B60N 2/20
[52] U.S. Cl. ..................................... 297/341; 248/430
[58] Field of Search ................ 297/341; 248/429, 430

[56] References Cited

U.S. PATENT DOCUMENTS

| | | |
|---|---|---|
| 3,940,182 | 2/1976 | Tamura . |
| 4,101,169 | 7/1978 | Muraishi . |
| 4,440,442 | 4/1984 | Drouillard . |
| 4,615,551 | 10/1986 | Kinaga et al. ............... 297/341 |
| 4,648,657 | 3/1987 | Cox . |
| 4,652,052 | 3/1987 | Hessler et al. ............... 297/341 |
| 4,671,571 | 6/1987 | Gionet . |
| 4,707,030 | 11/1987 | Harding ....................... 297/341 |
| 4,852,846 | 8/1989 | Weier . |
| 4,881,774 | 11/1989 | Bradley . |
| 4,961,559 | 10/1990 | Raymor . |

*Primary Examiner*—Peter R. Brown
*Attorney, Agent, or Firm*—Neil H. Hughes; Ivor M. Hughes

[57] ABSTRACT

An easy entry seat track assembly is provided. The assembly includes a mechanical memory for the comfort position when the seat is moved to the easy entry position and returned. A latching mechanism is provided which engages a latching plate at a multiplicity of positions to establish a comfort setting for the occupant. A handle is provided to establish the comfort setting. The handles has a detent which is automatically releasably engageable with the latch mechanism when the seat moves to the easy entry position and returns to the comfort position.

25 Claims, 10 Drawing Sheets

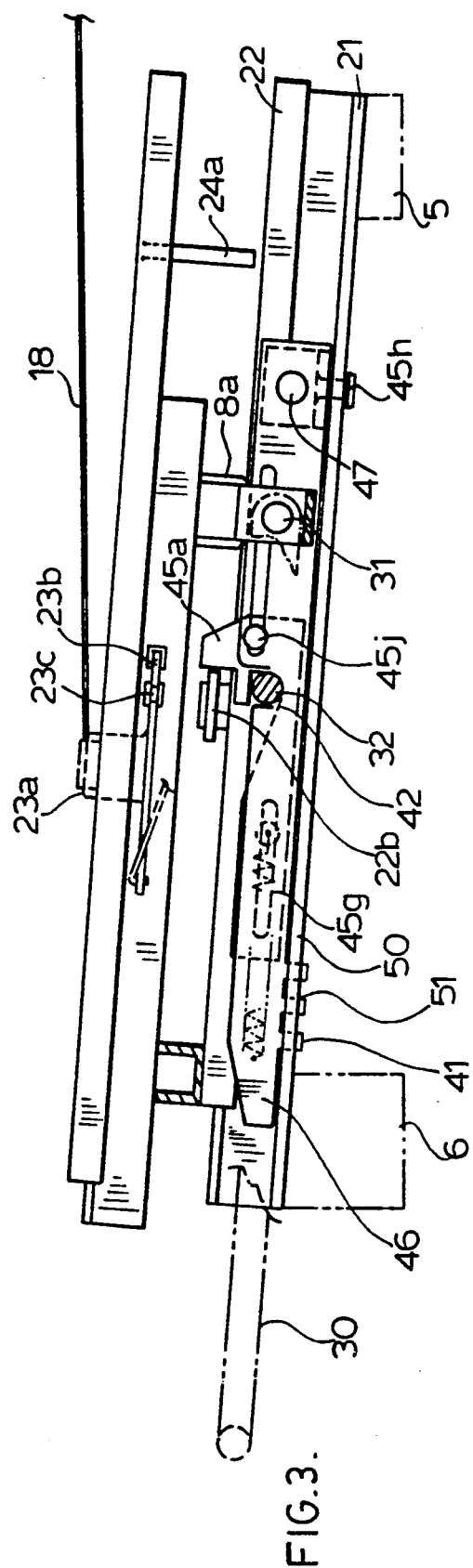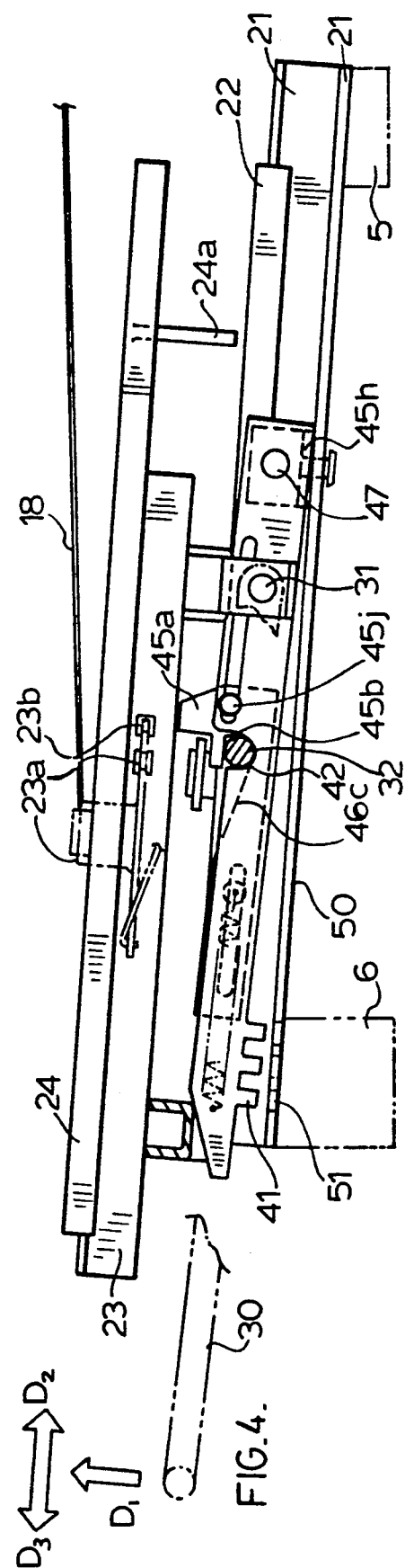

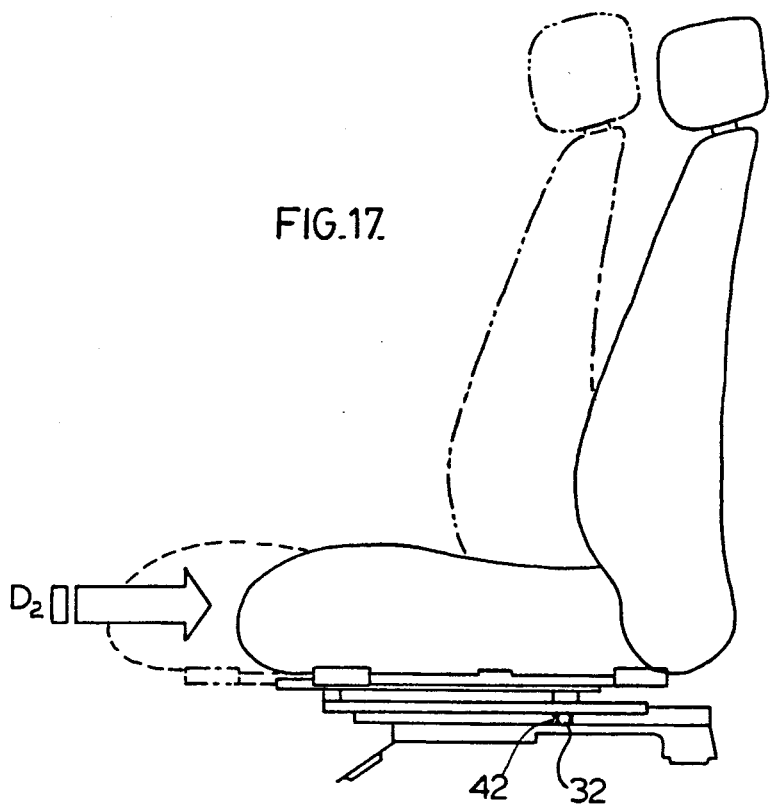
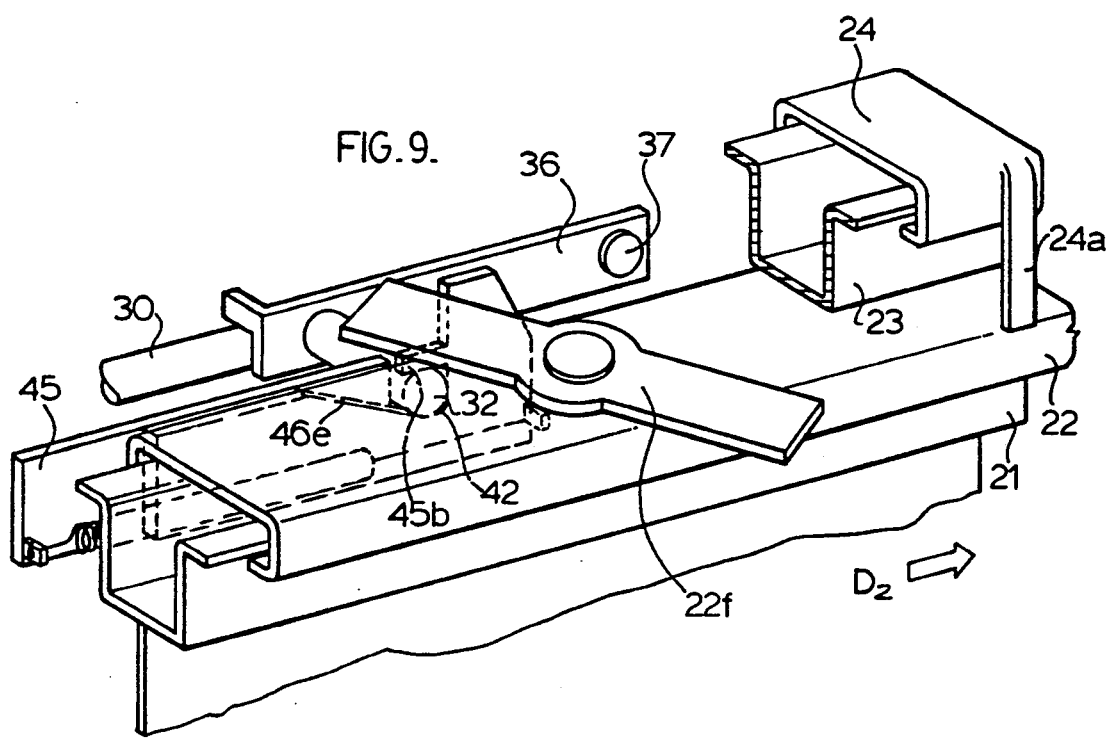

5,137,331

SEAT TRACK ASSEMBLY WITH MECHANICAL MEMORY

FIELD OF INVENTION

This invention relates to a seat assembly for use particularly in a two door vehicle. The seat assembly allows the entrance or exit of passengers from behind the seat and a subsequent return of the seat to a memory position set by the front seat occupant.

BACKGROUND OF THE INVENTION

Many two door vehicles exist in the market place. It is however desirable to allow the occupants of a rear seat in the vehicle ample space to enter and exit to the rear seats. Many examples exist in the prior art of such structures, allowing the ingress/egress of an occupant from the rear seat by tilting the seat back of the front seat thus releasing a moveable track in relation to a fixed track allowing the front seat to slide to a full extent in a forward position thus allowing occupants of the rear seat ample space to exit or enter the rear seat. Some examples exist in the prior art of seat tracks which have double sets of tracks. These tracks include a lower fixed track, fixed to the vehicle frame, a lower moveable track slidable on the fixed track, a upper fixed track fixed to the lower moveable track and a upper moveable track moveable with respect to the upper fixed track. Such an assembly provides for maximum comfort for the ingress/egress of occupants of a rear seat. One of the difficulties however, for an occupant of a front seat is that each time the rear seat passengers exit or enter the vehicle, a pre-adjusted position set by the front seat occupant may be lost.

Thus, a distinct advantage is obtained to the seat occupant when a memory is provided for the front seat occupants. When the front seat occupants therefor pre-adjust their seat to a predetermine position of comfort for each user, it is desirable that this position be remembered by the seat assembly and maintained inspite of the easy entry seat assembly provided.

Examples exit in the prior art of a seat mechanism having memory in conjunction with the easy entry feature. Often it is the case that the memory is established on either the inboard or outboard rails only, wherein the latching of the seat to an adjusted position is provided by one mechanism and the establishment of the memory is provided by a second separate mechanism. The easy entry feature may be provided by a third mechanism. These mechanism are often very complex and involved requiring a considerable number of latching segments. These assembly because of there complexity may prove to be unreliable in the long term.

U.S. Pat. No. 4,101,169 to the Nissan Motor Company describes a seat structure having a memory and providing an easy entry assembly. The memory is provided on the outboard side of the assembly only. A separate latch is provided on the inboard side which is made dependant on the outboard latch. However, once the easy entry position is reached by the seat with the seat back in a pivoted position if the seat is returned to the pre-set adjusted position it will travel beyond that established point with the seat back pivoted. Also it would be advantageous to have the memory located on both the inboard and outboard sides of the seat assembly. It also would be advantageous to provided the memory function, coincidence with the comforts setting of the seat assembly.

U.S. Pat. No. 4,440,442 to General Motors also is an example of a memory in a seat track which is dependant upon the operation of the seat back. No locking of the seat will occur until the seat back is an upright position. Again the mechanisms with the seat track provide for a single mechanism for memory and a separate mechanism for the comfort adjustment. The memory is located on the outboard side only of the track assembly and there is no latching mechanism on the inboard side which raises the question as to reliability of this mechanism. It would be advantageous if the comfort setting and the memory were conveniently provided in a single functioning latch mechanism.

U.S. Pat. No. 3,940,182 to the Nissan Motors Company provides a more complex memory mechanism which is actuated by a rotatable shaft and includes two latches with required plates. The assembly of this latch may be difficult. Again the memory is located on the outboard side only with a latch mechanism located on the outboard side which also cooperatively engages an dependant inboard latch mechanism. Again it would be advantageous to include comfort and memory settings which are defined by one mechanism. Further it would be advantageous to simplify the structure so it is easy to manufacture and assemble.

U.S. Pat. No. 4,648,657 to the Atwood Vacuum Machine Company describes a complicated seat track assembly which includes three outboard levers for comfort adjustment. The levers are dependant upon one another. Again it would be advantages to provide a simpler mechanism which is easier to assemble and manufacture.

U.S. Pat. No. 4,852,846 to General Motors provides a seat assembly which includes fixed notches used in conjunction with a rotating member. Such an assembly would be complex to assemble and have tight tolerances of manufacture. Again the memory is on the outboard side only and the inboard latch mechanism is dependant on the outboard latch mechanism for operation.

U.S. Pat. No. 4,671,571 to General Motors is another example of an assembly where the memory is dependant on the pivoting of the seat back to an upright position. If the seat were moved rearwardly after reaching the most forward easy entry position without the seat back in an upright position, then from the description at column 3, line 54 to 60 the seat will travel beyond its pre-set position. Further, a considerable effort is required to adjust the seat, since the initial frictional engagement of the memory bar and its lugs must be overcome during the comfort adjustment. It would be beneficial if this design were simplified and if the multiple latch mechanisms were integrated into a single functioning memory and comfort adjustment. Simplification may be a great improvement in reliably as well.

U.S. Pat. No. 4,881,774 to Bertrand Faure Automobile describes a memory seat track assembly which has a memory, which allows a user to allow ingress/egress of a passenger from the rear seat and a return of the seat to its pre set position. However, the mechanism used is complicated and requires both a track latch mechanism and a separate memory lock mechanism for operation. It again would be beneficial if the mechanisms were integrated into one positive mechanism which provides both the comfort and memory setting.

Finally U.S. Pat. No. 4,961,559 to Chrysler describes a seat track assembly having a comfort adjustment but no memory. The seat is also not an easy entry seat.

Nowhere within the prior art is there found a track assembly which includes a unitary memory and comfort latch mechanism in a easy entry seat track assembly which provides for latching on both the inboard and outboard rails separately and coincidentally which improves both the safety and reliability of the seat track assembly.

It is therefore a primary object to this invention to simplify the seat track assemblies of the prior art, and provide a safer and more reliable assembly.

It is a further object of the invention to provide a seat track assembly for an easy entry application which is easy to use and which automatically disengages the seat track from the comfort position to allow ingress and egress of a occupant of a rear seat, and provides a memory to re establish the comfort position.

Further and other objects of the invention will become apparent to a man skilled in the art when considering the following summary of the invention and the more detail description of the preferred embodiments illustrated herein.

SUMMARY OF THE INVENTION

According to one aspect of the invention there is provided an easy entry seat track assembly with integral comfort and mechanical memory for a vehicle seat having a pivotable seat back, the seat having an inboard and outboard side, a front and a rear, the seat track assembly comprising proximate the inboard and outboard sides, a fixed lower rail fixed to the frame of a vehicle and extending from proximate the front to proximate the rear of the seat, a latching plate fixed to the frame of the vehicle and extending from proximate the front to proximate the rear of the seat, preferably the installation of the latching plate and the fixed lower rail to the frame being with a common assembly, each latching plate having a multiplicity of juxtaposed detent portions (preferably openings) extending from proximate the front to proximate the rear of the seat, each fixed rail having a moveable rail mounted therewith for movement thereof from rear to front of the seat to the easy entry position when free to do so, each moveable rail having disposed therewith release means for automatically disengaging each moveable rail from each fixed rail when the seat back is pivoted, each latching plate having a slot extending from proximate the front to proximate the rear of the seat and extending adjacent the multiplicity of detent portions, each latching plate having latching means therewith having first and second detent means (preferably an opening), each latching means being releasably moveable (preferably slidable) in the slot with the latching plate and moveable (preferably pivotable) from a position wherein the first detent means of each latching means engages the detent means of each latching plate, to a position wherein the first detent means of each latching means disengages the detent means of each latching plate whereat each latching means is free to slide within the slot of each latching plate to a new comfort position and memory and thereat reengage the first detent means of each latching means with the detent means of each latching plate, the inboard and outboard moveable rails having secured therewith handle means, the handle means being accessible to a seat occupant and simultaneously engaging the inboard and outboard track assembly and each latching means thereof, preferably the handle means being pivotally secured with each moveable rail, preferably including a supplementary handle portion with which the detent means is provided which preferably pivots on the same pivot as the handle means thereby providing independent latching of the inboard and outboard latching means, and moveable, preferably upwardly away from the rail, by the occupant to disengage the first detent means of each latching means from the detent means of each latching plate and allowing movement of each latching means in the slot of each latching plate to establish a new comfort setting and memory position whereat the first detent means of each latching means engages different juxtaposed detent means of each latching plate, the handle means including detent means (preferably a pin) for detachably engaging the second detent means of each latching means when the first detent means of each latching means engages the detent means of each latching plate and when the seat is latched and not moveable, the detent means of the handle means being automatically disengageable from the second detent means of each latching means when the seat back is pivoted and the release means is actuated, whereby the detent means of the handle means disengages the second detent means of each latching means thereby releasing the handle means and each moveable rail from each latching means and each fixed rail and thus allowing forward motion of the seat, whereat the first detent means of each latching means remains engaged with the detent means of each latching plate to retain the comfort setting of the seat during movement of the seat track assembly when the seat is moved to the easy entry position, whereby when the seat track is returned to the comfort position from the easy entry position by the seat occupant, as each moveable track moves to the rear the detent means of the handle means reengages the second detent means of the latching means to latch the handle means and each moveable rail with respect to each latching means and each fixed rail without changing the comfort setting of each latching means with each latching plate.

According to a preferred embodiment of the invention the seat track assembly may further comprise a second fixed rail fastened with and preferably above each moveable rail disposed proximate the inboard and outboard sides of the seat, each second fixed rail having a second moveable rail mounted therewith for movement thereof from rear to front of the seat to the easy entry position when free to do so, each second moveable rail carrying a latching mechanism actuated by the forward pivoting of the seat back to disengage each second moveable rail from each second fixed rail and to allow movement of each second moveable rail towards the front of the seat, preferably each second moveable rail including second release means (preferably the second release means being an appendage extending away from each second moveable rail) to engage each release means for the detent means of the handle means, the detent means of the handle means being automatically disengagable from the second detent means of each latching means when each second moveable rail moves to proximate its fully forward position whereat the second release means of each second moveable rail engages the release means for the detent means of the handle means thereby releasing the handle means and each moveable rail from each latching means and each fixed rail and thus allowing forward motion of the seat to the easy entry position.

According to another aspect of the invention there is provided an easy entry seat track assembly with integral comfort and mechanical memory for a vehicle seat having a pivotable seat back, the seat having an inboard and outboard side, a front and a rear, the seat track assembly comprising proximate the inboard and outboard sides, a fixed lower rail fixed to the frame of a vehicle and extending from proximate the front to proximate the rear of the seat, a latching plate fixed to the frame of the vehicle and extending from proximate the front to proximate the rear of the seat, preferably the installation of the latching plate and the fixed lower rail to the frame being at common points, each latching plate (preferably extending horizontally) having a multiplicity of juxtaposed openings (preferably the openings extending substantially vertically), each plate extending from proximate the front to proximate the rear of the seat, each fixed rail having a moveable rail releasable mounted therewith for movement thereof from rear to front of the seat to the easy entry position when free to do so, each moveable rail being automatically disengaged from the fixed rail when the seat back is pivoted, the pivoting of the seat back actuating a release mechanism with the track assembly to allow movement of each moveable rail, each latching plate having a slot extending from proximate the front to proximate the rear of the seat and extending adjacent the multiplicity of openings, each latching plate having a latching mechanism slidable engaged with the slot of the latching plate and pivotally attached proximate its end to the latching plate, preferably a supplementary latch portion is provided which engages the slot of the latching plate being slideable therein, each latching mechanism including first and second pawl like portions extending generally away from the juxtaposed openings of the latching plate, each first portion of each latching mechanism having disposed proximate one side thereof a multiplicity of teeth for engaging the juxtaposed openings of each latching plate and thus when engaged defining the comfort and memory of the seat track assembly, each first portion having a recess disposed at the side of each first portion remote the teeth, each second portion of each latching mechanism being resiliently biased towards the front of the seat and being fastened with the first portion and slideable in relation thereto, the first portion and preferably the supplementary portion being slidably retained in the slot of each latching plate, and being pivotable at the end, each second portion including a recess, preferably the recess of each second portion being defined by a cam surface with the second portion proximate the front of the recess (preferably the cam surface tapering forwardly and upwardly away from the bottom of the recess) and a detent proximate the side of the second portion proximate the recess, the detent for engagement with the release mechanism of the track assembly, and a locking appendage of the second portion proximate the rear of the recess and extending partially over the recess towards the cam surface, of the second portion; each latching mechanism being releasable slidable in the slot with the latching plate and preferably slideable with the supplementary portion and pivotable from a position wherein the teeth of each latching mechanism engage the openings of each latching plate, to a position wherein the teeth of each latching mechanism disengage the openings of each latching plate whereat each latching mechanism is free to slide within the slot of each latching plate to a new comfort position and memory and thereat reengage the teeth of each latching mechanism with the openings of each latching plate, the inboard and outboard moveable rails having secured therewith a handle (preferably being generally U shaped) and being accessible to a seat occupant, the handle simultaneously engaging each inboard and outboard track assembly and each latching mechanisms thereof, preferably by a supplementary handle portion pivotable with the handle for disengaging the comfort setting, the handle being pivotally secured with each moveable rail, and pivotable upwardly away from the rail by the occupant to disengage the teeth of each latching mechanism from the openings of each latching plate and thereby allowing movement of each latching mechanism in the slot of each latching plate urged by the occupant to establish a new comfort setting and memory position whereat the teeth of each latching mechanism engage different juxtaposed openings of each latching plate, the handle and preferably the supplementary handle portion, having disposed therewith a pin proximate each latching mechanism for detachably engaging the recesses of the first and second portions of each latching mechanism when the teeth of each latching mechanism engages the openings of each latching plate and when the seat is latched and not moveable, each pin of the handle being automatically disengagable from the recesses of the first and second portions of each latching mechanism when the seat back is pivoted actuating the release mechanism which engages the detent of the second portion of each latching mechanism, (preferably the supplementary handle portion being separately pivotable when the pin reengages the recess of the latching mechanism thus providing independent inboard and outboard latching) whereby each pin of the handle disengages the recesses of each latching mechanism, each pin of the handle being urged to leave the recesses of the portions of each latching mechanism by the cam surface of the second portion of the latching mechanism as the second portion moves rearwardly, actuated by the release mechanism of the track assembly, thereby lifting each pin from the recesses and simultaneously moving the locking appendage of the second portion rearwardly away from locking the pin in the recesses, whereat the handle and each moveable rail are disengaged from each latching mechanism and the fixed rail and thus allows forward motion of the seat, the teeth of each latching mechanism remaining engaged with the openings of each latching plate to retain the comfort setting of the seat during movement of the seat track assembly when the seat is moved to the easy entry position, whereby when the seat track is returned to the comfort position from the easy entry position by the seat occupant, as each moveable track moves to the rear, each pin of the handle, and preferably of the supplementary handle portion, reengages the recesses of each latching mechanism as the release mechanism disengages the detent of the second portion and urges the second portion rearwardly to latch each pin of the handle with the locking appendage of the second portion of each latching mechanism thereby latching the handle and each moveable rail with respect to each latching mechanism and each fixed rail without changing the comfort setting of each latching mechanism with each latching plate.

According to another embodiment of the invention the seat track assembly may further comprise a second fixed rail fastened with and preferably above each moveable rail disposed proximate the inboard and outboard sides of the seat, each second fixed rail having a second moveable rail mounted therewith for movement thereof from rear to front of the seat to the easy entry position when free to do so, each second moveable rail carrying a pawl mechanism actuated by the forward pivoting of the seat back to disengage each second moveable rail from each second fixed rail and to allow movement of each second moveable rail towards the front of the seat, preferably each second moveable rail including second release mechanism (preferably the second release mechanism being an appendage extending away from each second moveable rail) to engage each release mechanism for each pin of the handle, each pin of the handle being automatically disengagable from the recesses of each latching mechanism when each second moveable rail moves to proximate its fully forward position whereat the second release mechanism of each second moveable rail engages the release mechanism for each pin of the handle thereby releasing the handle and each moveable rail from each latching mechanism and each fixed rail and thus allowing forward motion of the seat to the easy entry position.

According to another aspect of the invention there is provided for use with an easy entry seat track assembly with integral comfort and mechanical memory for a vehicle seat having a pivotable seat back, a mechanical memory and comfort adjustment mechanism, the seat having an inboard and outboard side, a front and a rear, the seat track assembly having proximate the inboard and outboard sides, a fixed lower rail fixed to the frame of a vehicle and extending from proximate the front to proximate the rear of the seat, a latching plate fixed to the frame of the vehicle and extending from proximate the front to proximate the rear of the seat, preferably the installation of the latching plate and the fixed lower rail to the frame being at common points, the latching plate (preferably extending horizontally) having a multiplicity of juxtaposed openings (preferably the openings extending substantially vertically), the plate extending from proximate the front to proximate the rear of the seat, the fixed rail having a moveable rail releasable mounted therewith for movement thereof from rear to front of the seat to the easy entry position when free to do so, the moveable rail being automatically disengaged from the fixed rail when the seat back is pivoted, the pivoting of the seat back actuating a release mechanism with the track assembly to allow movement of each moveable rail, each latching plate having a slot extending from proximate the front to proximate the rear of the seat and extending adjacent the multiplicity of openings, the mechanical memory and comfort adjustment mechanism comprising a latching mechanism slidably engaged with the slot of the latching plate and pivotally attached proximate its end to the latching plate, preferably a supplementary latch portion is provided which engages the slot of the latching plate being slideable therein the latching mechanism including first and second pawl like portions extending generally away from the juxtaposed openings of the latching plate, the first portion of each latching mechanism having disposed proximate one side thereof a multiplicity of teeth for engaging the juxtaposed openings of the latching plate and thus when engaged defining the comfort and memory of the seat track assembly, the first portion having a recess disposed at the side of each first portion remote the teeth, the second portion of the latching mechanism being resiliently biased towards the front of the seat, and being fastened with the first portion and slideable in relation thereto, the first portion and preferably the supplementary portion being slidably retained in the slot of the latching plate, and being pivotable at that end, the second portion including a recess, the recess of the second portion being defined by a cam surface with the second portion proximate the front of the recess, (preferably the cam surface tapering forwardly and upwardly away from the bottom of the recess) and a detent proximate the side of the second portion remote the recess, the detent for engagement with the release mechanism of the track assembly, and a locking appendage of the second portion proximate the rear of the recess and extending partially over the recess towards the cam surface of the first portion, the latching mechanism being releasably slidable in the slot with the latching plate and preferably slideable with the supplementary portion and pivotable from a position wherein the teeth of the latching mechanism engage the openings of the latching plate, to a position wherein the teeth of the latching mechanism disengage the openings of the latching plate whereat the latching mechanism is free to slide within the slot of the latching plate to a new comfort position and memory and thereat reengage the teeth of the latching mechanism with the openings of the latching plate, the moveable rail having secured therewith a handle and being accessible to a seat occupant, the handle simultaneously engaging the moveable rail and the latching mechanisms, preferably by a supplementary handle portion pivotable with the handle for disengaging the comfort setting the handle being pivotally secured with the moveable rail, and pivotable upwardly away from the rail by the occupant to disengage the teeth of the latching mechanism from the openings of the latching plate and thereby allowing movement of the latching mechanism in the slot of the latching plate urged by the occupant to establish a new comfort setting and memory position whereat the teeth of the latching mechanism engage different juxtaposed openings of the latching plate, the handle and preferably the supplementary handle portion having disposed therewith a pin proximate the latching mechanism for detachably engaging the recesses of the first and second portions of the latching mechanism when the teeth of the latching mechanism engages the openings of the latching plate and when the seat is latched and not moveable, the pin of the handle being automatically disengagable from the recesses of the first and second portions of the latching mechanism when the seat back is pivoted actuating the release mechanism which engages the detent of the second portion of the latching mechanism, preferably the supplementary handle portion being separately pivotable when the pin reengages the recess of the latching mechanism thus providing independent inboard and outboard latching whereby the pin of the handle disengages the recesses of the latching mechanism, the pin of the handle being urged to leave the recesses of the portions of the latching mechanism by the cam surface of the second portion of the latching mechanism as the second portion moves rearwardly, actuated by the release mechanism of the track assembly, thereby lifting the pin from the recesses and simultaneously moving the locking appendage of the second portion rearwardly away from locking the pin in the recesses, whereat the handle and the moveable rail are disengaged from the latching mechanism and the fixed rail and thus allows forward motion of the seat, the teeth of the latching mechanism remaining engaged with the openings of the latching plate to retain the comfort setting of the seat during movement of the seat track assembly when the seat is moved to the easy entry position, whereby when the seat track is returned to the comfort position from the easy entry position by the seat occupant, as the moveable track moves to the rear, the pin of the handle and preferably of the supplementary handle portion, reengages the recesses of the latching mechanism as the release mechanism disengages the detent of the second portion and urges the second portion rearwardly to latch the pin of the handle with the locking appendage of the second portion of the latching mechanism thereby latching the handle and the moveable rail with respect to the latching mechanism and the fixed rail without changing the comfort setting of the latching mechanism with the latching plate.

In a preferred embodiment of the invention each supplementary handle portion of the seat track assembly, and of the mechanical memory latching mechanism is pivotable at each of the inboard and outboard sides of the track assembly on a common pivot with the handle, each supplementary portion including a detent to engage the handle when the handle is moved upwardly away from the track assembly to readjust the comfort position and the pin is retained in the recess, of the latching mechanism yet when the pin leaves the recess of the latching mechanism when the seat moves to the easy entry position, each supplementary portion is separately pivotable allowing the pin to leave the recess and to reengage the recess independently of the handle thereby providing independent latching at both the inboard and outboard sides of the seat track assembly. This feature is desirable should one of the inboard and outboard latch mechanism not successfully latch due to an obstruction such as a pop can.

BRIEF DESCRIPTION OF THE DRAWINGS

The invention will now be illustrated with respect to the following drawings illustrating embodiments of the invention in which:

FIG. 3 is a side plan view of the seat track assembly of FIG. 1 showing the comfort setting and illustrated in the preferred embodiment of the invention.

FIG. 4 is a similar view to that of FIG. 3 showing the comfort position adjustment and illustrated in a preferred embodiment of the invention.

FIGS. 5, 6, 7, 8 and 9 are cut away perspective views of the outboard rail of FIG. 1 and similar in inter relationships to that of FIG. 2 showing the various positions or the latching and release mechanism of the track assembly illustrated in a preferred embodiment of the invention.

FIG. 12 through 17 are a sequence of view illustrated in an operation of the seat in use had illustrated in a preferred embodiment of the invention.

DETAILED DESCRIPTION OF PREFERRED EMBODIMENTS OF THE INVENTION

Figure 1:
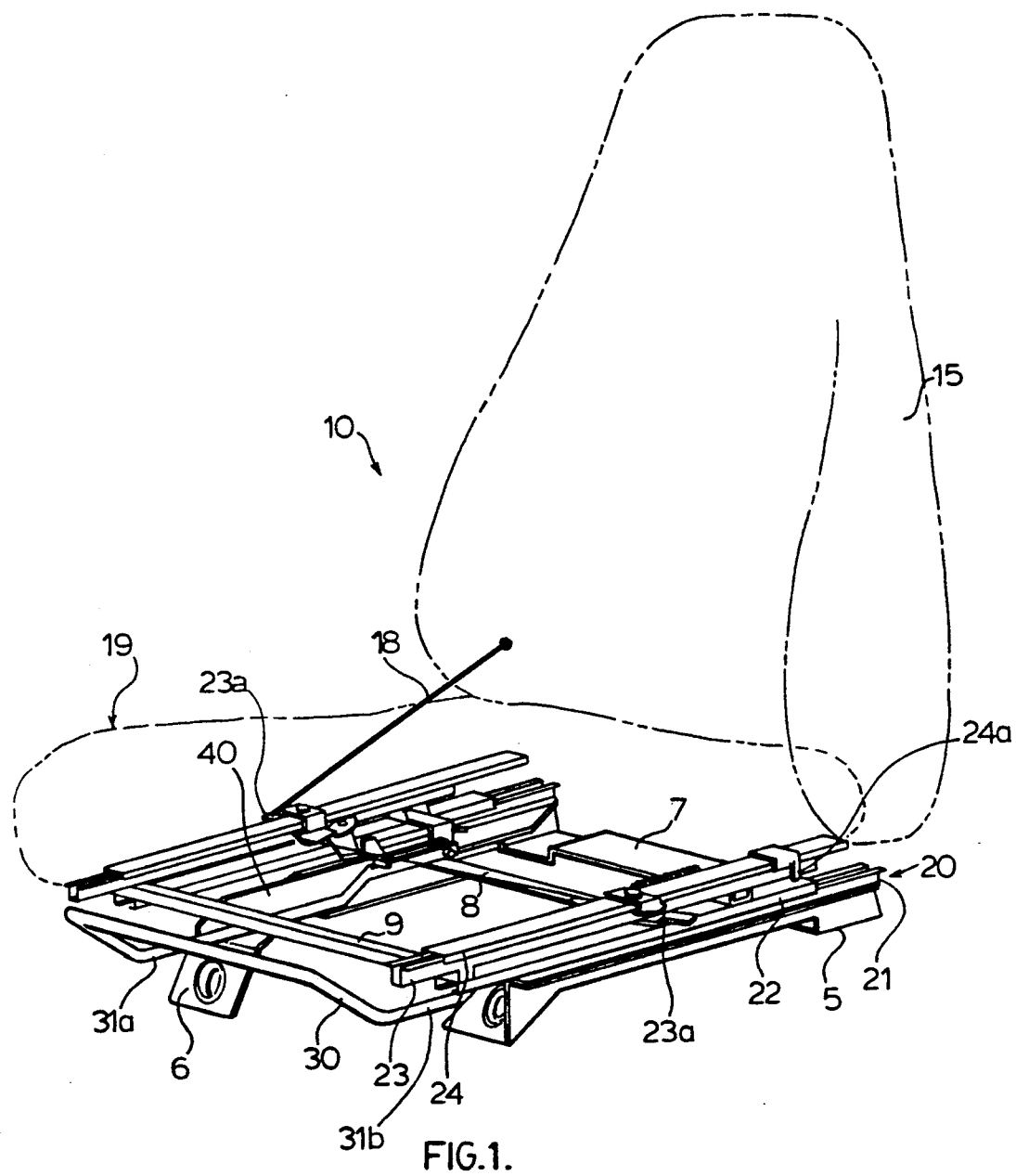
FIG. 1 is a perspective view of the seat track assembly illustrated in a preferred embodiment of the invention.

Referring generally to the drawings, in operation an individual lifts the handle 30 and disengages the teeth 41 from each (in board and out board,) latch 40, from the openings 51 in the latch plate 50 and repositions the seat 19 in relation to the plate 50 at the most appropriate adjustment, then lets handle 30 go to relatch the seat 19 in the final comfort position. A substantial pin 32 connects the handle 30 to the latch mechanism 40 and is disengageable from the latch mechanism 40 during ingress and egress when the seat back 15 is titled forward and the seat 19 is moved forward. The latch mechanism 40 engages the pin 32 on the top of the latching mechanism 40 in a recess 42. The latch mechanism 40 has two parts 45, 46, which extend parallel to the track. The 1st portion 46 carries the forked portions with teeth 41 which engage the openings 51 of the latch plate 50. The second portion 45 is resiliently biased and carries a tail 45a) which is engaged by a rotatable pawl 22(f) which moves the second portion 45 rearward in relation to the first portion 46. A cam surface 45e) within the second portion 45 adjacent the opening 42 causes the pin 32 to ride up out of the recess 42 when the second portion 45 of the latch mechanism 40 moves rearwardly in relation to the first portion 46 when urged by the rotatable pawl 22f). The rotatable pawl 22f) is activated by a release action when the upper track 24 moves to the ingress/egress position. An appendage 24a) extends from the moveable rail 24 to the rotatable pawl 22f) and rotates the pawl 22f) by engaging the tail 45a) of portion 45. When the pawl 22f) rotates it moves in a direction so as to move the second portion 45 (which is resiliently biased to promote a smooth return) to urge the pin 32 of the supplementary handle portion 36 to ride up on the cam surface 46e) of the second portion. When this happens the handle 30 is free to move along with the track 22 to the ingress/egress position. The handle 30 is pivoted and supported by a frame 8a) connected to the lower moveable rail 22. The latch mechanism 40 is pivoted from the latch bracket 45h) which is slideably affixed to the latch plate 50.

Referring to the drawings the sequence of events in moving the track assembly from the comfort position as seen in FIG. 12 through 17 to the ingress/egress position is as follows:

When the seat back 15 is tilted forward two levers 23a) on the upper ingress track rotate, with the slave dependent on the master, to disengage the upper ingress moveable track 24 from the upper stationary ingress track 23 and allow the forward movement of the upper track 24. The upper moveable track 24 moves forward to its full extent whereat the appendage 24a) on the upper moveable track 24 engages the rotatable pawl 22f). The lower moveable track 22 is connected to the upper fixed track 23 and is moveable therewith when the pin 32 of the supplementary handle portion 36 rides out of the recess 42 of the latch mechanism 40 as previously described. The lower moveable track 22 along with the upper fixed track 23 then moves to a fully forward position.

After ingress/egress the seat 19 will then be moved back by the occupant. As the seat is moved back the upper rail 24 will move back first until the openings of the upper fixed track 23 aligned with the detents 23b) of the release mechanism and are fastened thereat. The lower moveable track 22 will then move backward towards the comfort position until such time as the pin 32 of the supplementary handle portion 36 rides back to the recess of the latch mechanism 40 and whereat the pin 32 pushes the second portion 45 rearward when the pin 32 contacts the edge of the appendage 45b). The pin 32 will then drop in recess 42 as second portion 45 moves rearward until second portion 45 slides forward, being biased in that direction, to cover pin 32 in its engaged position. The latch mechanism 40 therefor has not changed in comfort position and the pin 32 ensures that the seat returns to its memory position.

Figure 15:
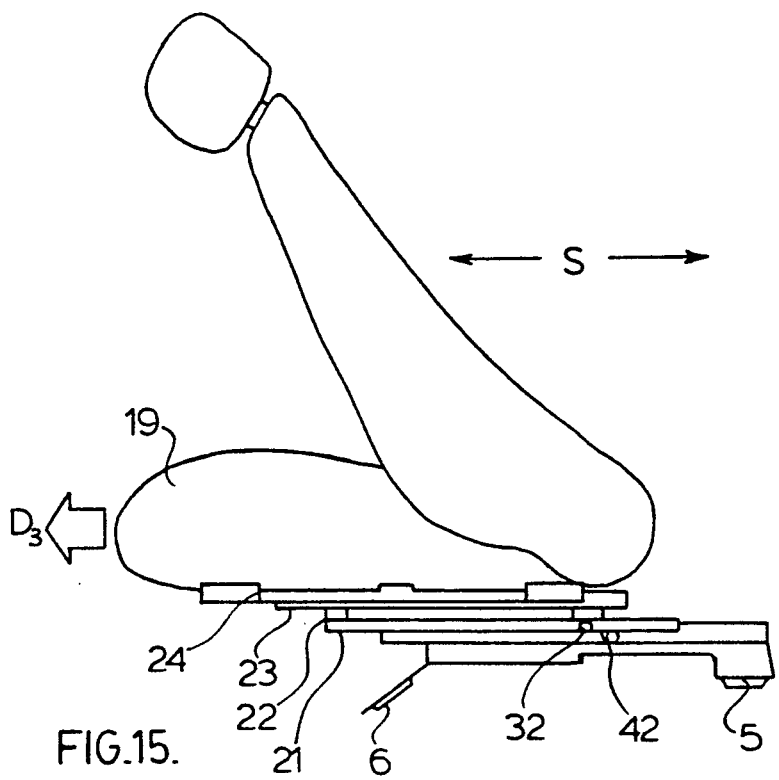
Figure 16:
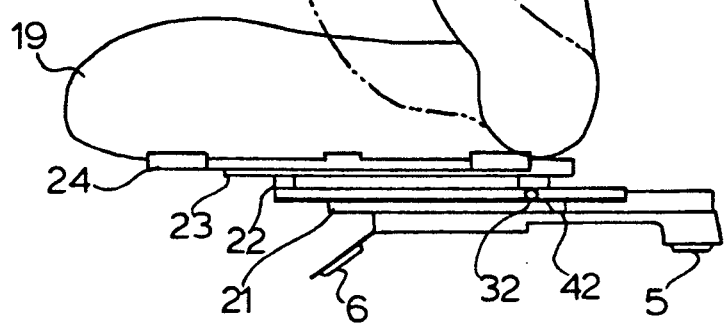

Referring now to FIG. 1 there is illustrated a seat track assembly 10 which has mounted thereto a seat cushion 19. The seat cushion 19 has a seat back 15 mounted therewith. The seat assembly 10 is generally known as an easy entry seat track assembly which is normally installed in a two door vehicle having rear seats. In order to allow access to the rear seat to passengers it is necessary that the front seat be moved to a fully forward easy entry position as best seen in FIG. 15 to allow ample space for the occupants of the rear seat to enter and exit the rear seat. FIG. 1 therefore shows a front seat 19 secured to a seat track assembly 20. The seat track assembly 20 is secured to a portion of the vehicle frame supported by frame members 5 and 6. The seat track assembly includes a lower fixed rail 21, fixed to the frame members 6 and 5 at both the inboard and outboard sides of the seat track assembly 20. Mounted with the fixed lower track 21 is a moveable track 22 which is releasably engagable with the lower track. The moveable track 22 has a fixed thereto an upper fixed 23 which moves along with the lower moveable track 22 when free to do so. The upper fixed track 23 has releasably engaged therewith a moveable track 24 upon which the seat assembly rides. The moveable track 24 also includes an appendage 24a the use of which will described hereinafter. A pawl mechanism 23a is resiliently biased and mounted on the moveable track 24 as best seen in relation to FIG. 2. The pawl 23a engages the seat back by connecting member 18. When the seat back therefore is pivoted the pawl 23a will also be pivoted to release upper moveable track from the fixed 23.

A handle 30 is provided being generally U-shaped and having legs 31a and 31b extending toward the seat track assembly. The handle is pivotable to allow upward and downward motion thereof. The handle mechanism as best seen in relation to FIG. 2 has a pin 31 upon which the handle is pivotable and a pin 32 affixed to supplementary portion 36 of the handle 30 the use of which will be described hereinafter.

Figure 2:
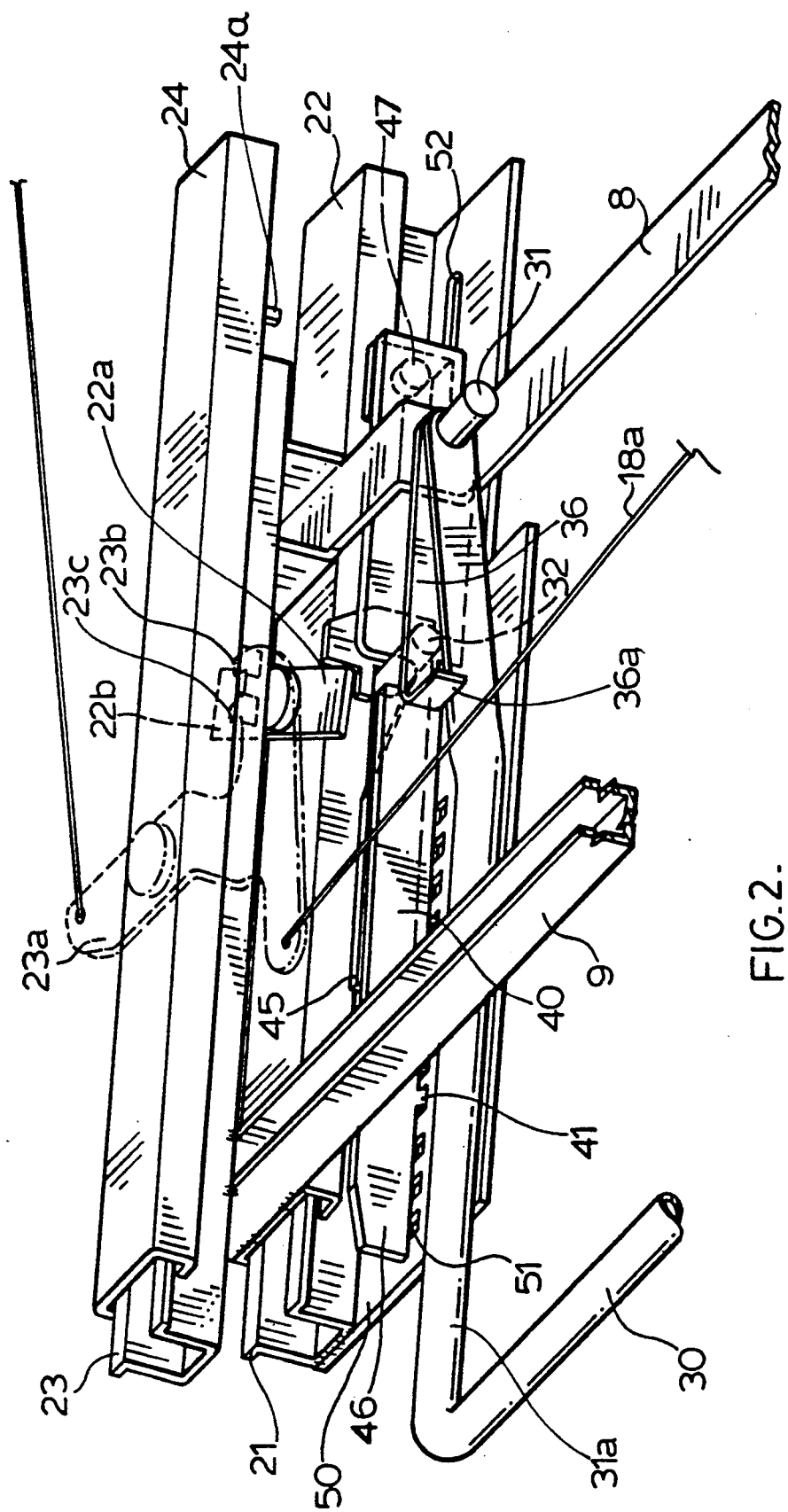
FIG. 2 is a close up cut away perspective view of the inboard rail of the track assembly of FIG. 1 illustrated in a preferred embodiment of the invention.

A latching plate 50 is provided which is also joined to the frame members 5 and 6 and which is joined thereto at common points to the lower track 21. As best seen in FIG. 2 to the latching plate 50 has a multiplicity of openings being generally rectangular in shape 51 and a longitudinal slot 52 extending a substantial length of the latching plated 50. Therefore when a seat occupant wishes to adjust the comfort position of the seat 19 he/she lifts the lever 30 upwardly and slides the seat forward to the appropriate comfort position whereat the handle is released. As best seen in FIG. 2 the upward motion of the handle 30 causes the teeth 41 of the latch mechanism 40 to disengage the openings 51 of the latch plate 50 thereby allowing the repositioning of the seat track assembly to the comfort position. When access to the rear seat is required the occupant tilts the seat back 15 forwardly, which causes the pawls 23a to rotate as best seen in FIG. 2 thereby allowing the forked portions 23c of pawl 23a to disengage from openings 23b of the fixed track 23. Therefore the upper track 24 would be free to move in relation to the upper fixed track 23. In more detailed description of this movement will follow. The seat track assembly 20 includes inboard and outboard rail assemblies which are identical with the acception that the release mechanism 23a are on opposite sides of the track. Bracing members 9 and 8 and 7 extend from the center and ends of the seat track assembly to rejudify the structure.

Referring now to FIG. 2 there is illustrated the inboard portion of the seat track assembly of FIG. 1 in cut away perspective to illustrate the inter relationship of the components thereof. In a latching plate 50 is therefor affixed with the lower track 21 to the frame members not shown. The latching plate 50 has the multiplicity of opening therein 51 which are engageable by the forked pin portions 41 of the latching mechanism 40. The latching mechanism 40 includes a pivotable pawl 46 used to establish the comfort settings of the seat track and a slideable pawl 45 used to release the seat mechanisms to the easy entry position. The latch assembly 40 is slideably retained within the slot 52 which allows the pawl 46 to move from front to rear of the seat to the necessary comfort position. In order to move the pawl 46 to the various comfort positions a handle 30 is provided being generally U shaped and having two legs 31a and 31b not shown. The leg 31a includes proximate the pivot thereof 31 a secondary handle portion 36 to which is fixed a pin 32. The pin 32 extends into a recess 42 of the latching mechanism 40. The recess 42 carrying the pin 32 is covered by a appendage 45b of the slideable pawl 45. The recess 46d of the pivotable pawl 46 has a compatible shape with the pin 32. The recess 45d of the slideable pawl 45 includes a forward cam surface 45e which extends from the bottom of the recess 45d toward the top of the pawl 45 and towards the front of the seat track assembly. The pawl 45 also includes a tail portion 45a which engages a release pawl mechanism 22f which includes an end 22b and an end 22a. The end 22a engages the tail 45a of the pawl 45. A more detailed description of the use of this inter relationship will be described hereinafter. The release mechanism 23a for the seat back are normally attached together from the inboard and outboard sides to ensure the cooperative motion, when releasing the upper moveable track 24 from the upper fixed track 23. The upper fixed track 23 is fixed in position in relation to the moveable track by frame portion 9. The handle portion 30 is fixed at the rear thereof via a frame member 8a to the lower moveable track 22. A detent 36a is provided with the supplementary handle portion 36 which engages the main handle leg 31a so that when the handle is lifted by the operator the pin engaging the latching mechanism 40 pivots the comfort pawl 46 by movement of the handle 30 upwardly engaging the detent 36a engaging the pin 32 which engages the appendage 45b covering the recess 42 thereby allowing the pivoting of the latch mechanism 40 upwardly away from the multiplicity of recess 51 which thereby establishes the comfort setting by the operator. The operator holding the handle up would then slide the assembly to the appropriate position, the latching mechanism 40 being slideable in the longitudinal slot 52 of the latching plate 50 until such time as the comfort position for that particular occupant is reached or in the handle is released reengaging the detents 41 being generally forked in shaped, with the openings 51 of the latching plate 50. Thereby a new comfort position has been achieved. The pawls are pivotable at the end 47 thereof. As illustrated in FIG. 2, the upper track 23 and 24 fixed to the moveable track 22 will not move individually and therefore will move along with the lower moveable track which is fixed with a handle portion 36 and 31a via the supplementary framing section 8a.

Referring now to FIG. 3 and FIG. 4 a side plan view of the description in relation to FIG. 2 is provided. The latch mechanism 40 therefore is illustrated with the pivotable pawl 46 pivotable at pin 47 and slideable within the slot 52 of the latching plate 50 by pin 45h which extends therethrough. The pawl 45 is slideable with respect to the pawl 46 and being pinned thereto in a slot 45f with the pawl 45 with a pin 45g passing therethrough. Therefore when the handle 30 is raised the detents 41 of the latch assembly 40 disengage the openings 51 of the latching plate 50 allowing establishing at a comfort position. However the pin 32 of the handle assembly is retained within the recess 42 locking position by the appendage 45b of the slideable pawl 45. The slideable pawl 45 is resiliently biased by pin 45j and the resiliently biasing spring thereof to allow sliding motion and forward biasing of the assembly when free to do so. At times however the tail 45a is engaged by the detent portion 22b which prevents forward sliding motion of the pawl 45 to its normal position as seen in FIG. 3. When lifted the handle 30 pivots at pivots 31 to start the comfort adjustment. However the pin 32 is retained within the recess 42. A tang portion 24a is provided with the upper moveable track 24 for this purpose. The tang 24a will abut the release mechanism 22f which abuts the tail portion 45a of the slideable pawl 45. This inter relationship will describe hereinafter, abutted is this inter relationship which allows the release of the pin 32 from the recess 42 of the latching mechanism 40 automatically while retaining the latched mechanism 46 in the detents 41 thereof in the comfort setting established by the openings 51 thus providing a memory to the latch mechanism.

Figure 5:
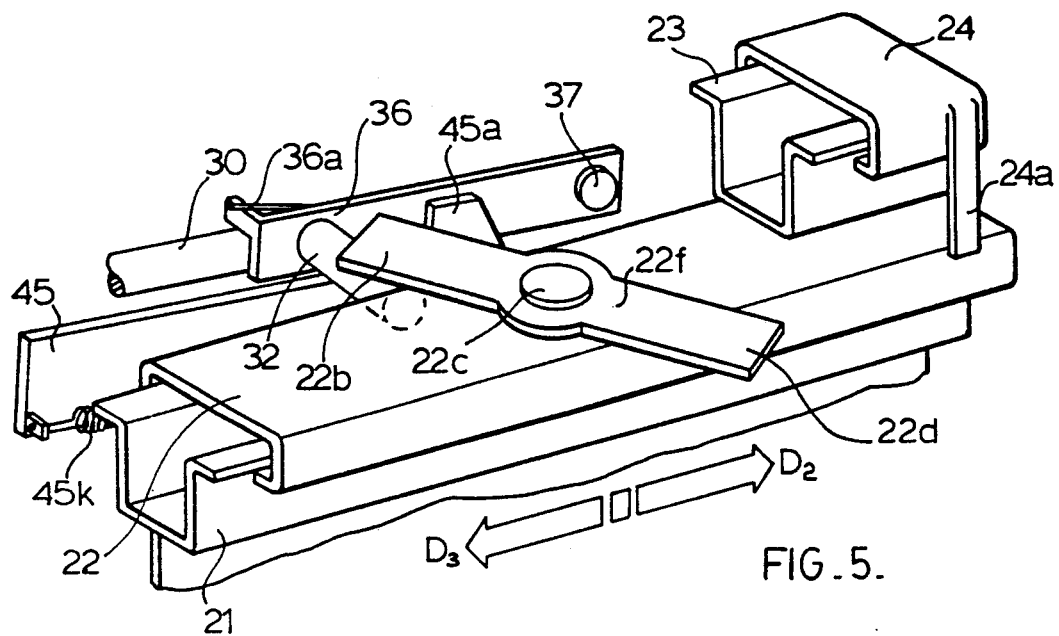
Figure 6:
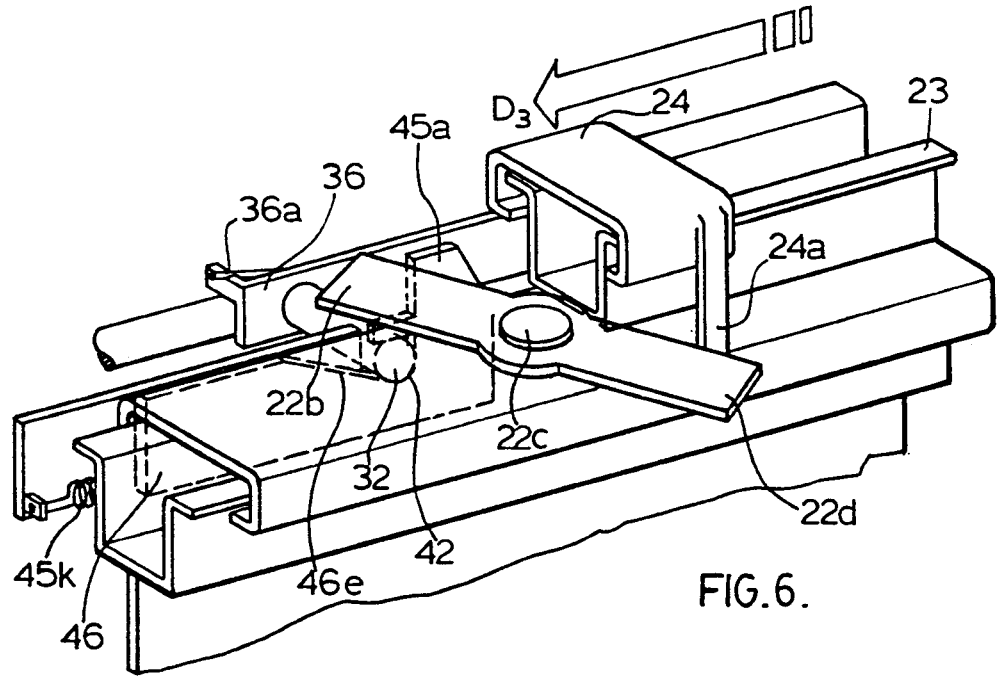
Figure 13:
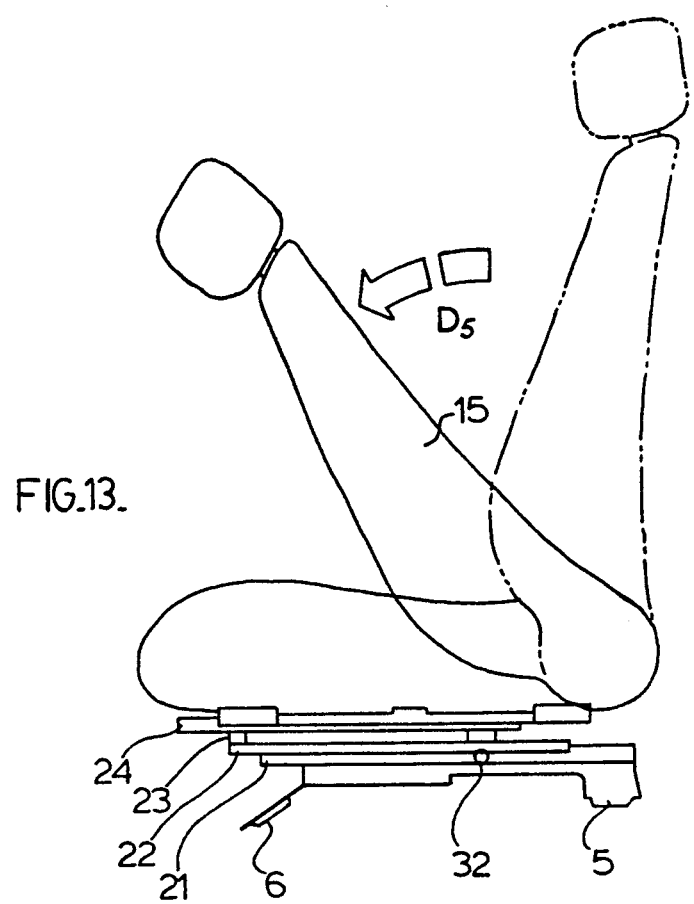
Figure 14:
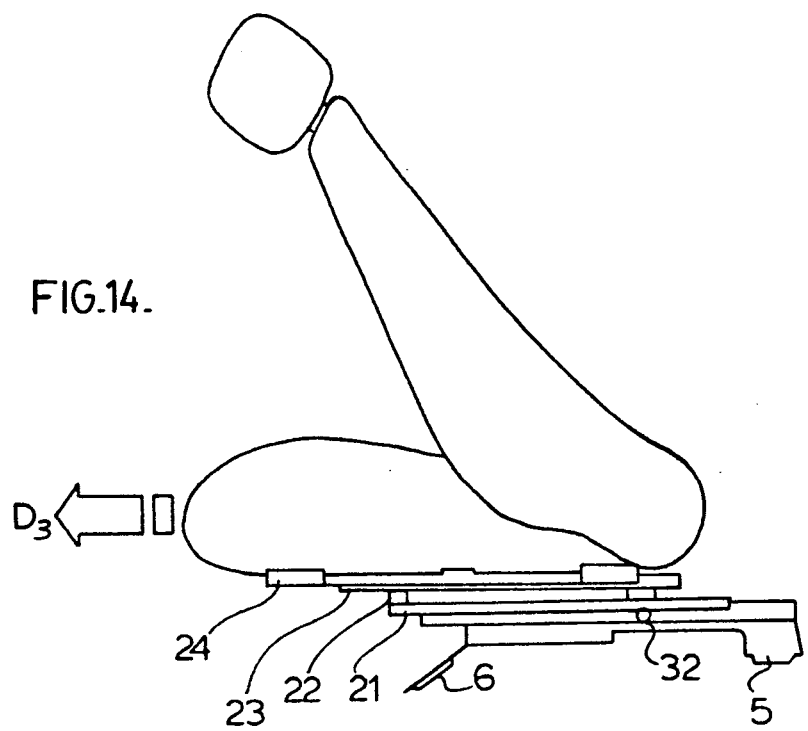

Referring now to FIGS. 5, 6, 7, 8, 9, 10 and 11 a more detailed description of achieving the ingress/egress position while maintaining the comfort setting of the seat is provided. As best seen in relation to FIG. 12 the comfort setting is achieved as previously described. However, when the seat back is pivoted as best seen in FIG. 13 the connecting portions 18 as best seen in FIG. 1 cause the pawl portions 23a to pivot in a direction so that as best seen in FIG. 2 the teeth 23c disengage the openings 23b and thereby allow the resiliently biased seat track to move towards the front of the seat assembly. Of coarse the resiliently biasing of the seat is accomplished by springs, the details of which are not provided being known to those skilled in the art. When therefore the moveable track 24 is free to move in relation to the fixed track 23 as seen in FIG. 5 the rear portion of the moveable track 24 carries an appendage 24a extending generally downwardly from the moveable track so that it will abut the portion 22d of the release mechanism 22f pivotably affixed to the lower moveable track 22 at pivot 22c. Again, this release mechanism 22f is resiliently biased via a spring mechanism not shown. It is resiliently biased counter clockwise. The handle 30 therefore of FIG. 5 is engaged with the latching mechanism 40 as best seen in FIG. 6 via the pin 32 in the recess 42 wherein the locking appendage 45b of the slideable pawl 45 retains the pin within its recess 45d and within the recess 46d of the pawl 46.

Figure 7:
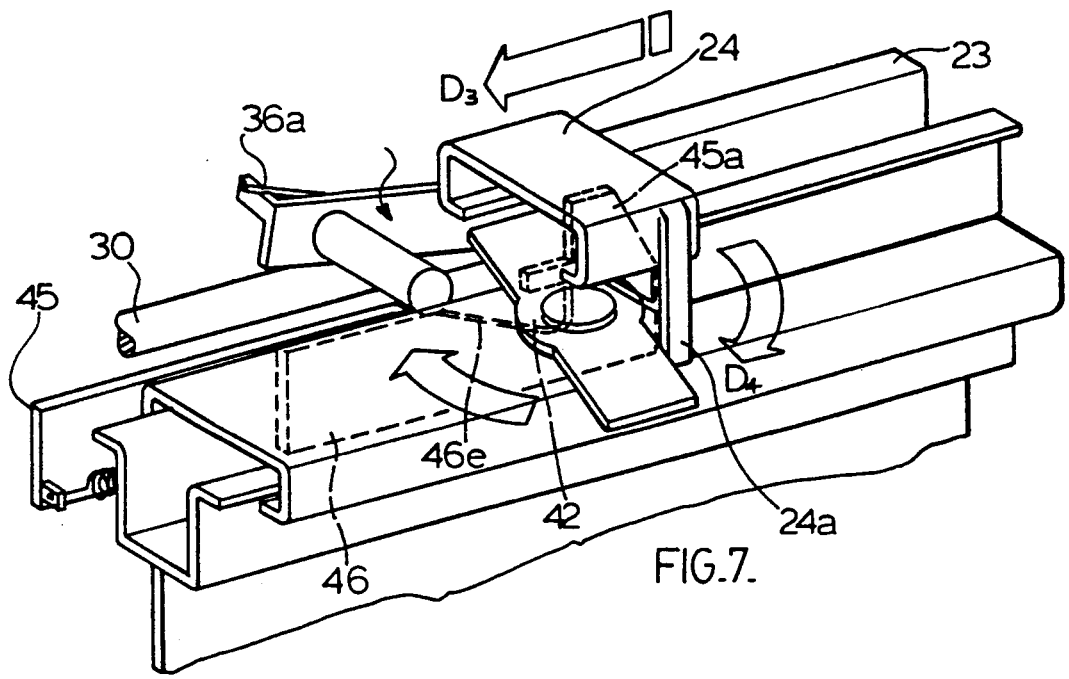
Figure 8:
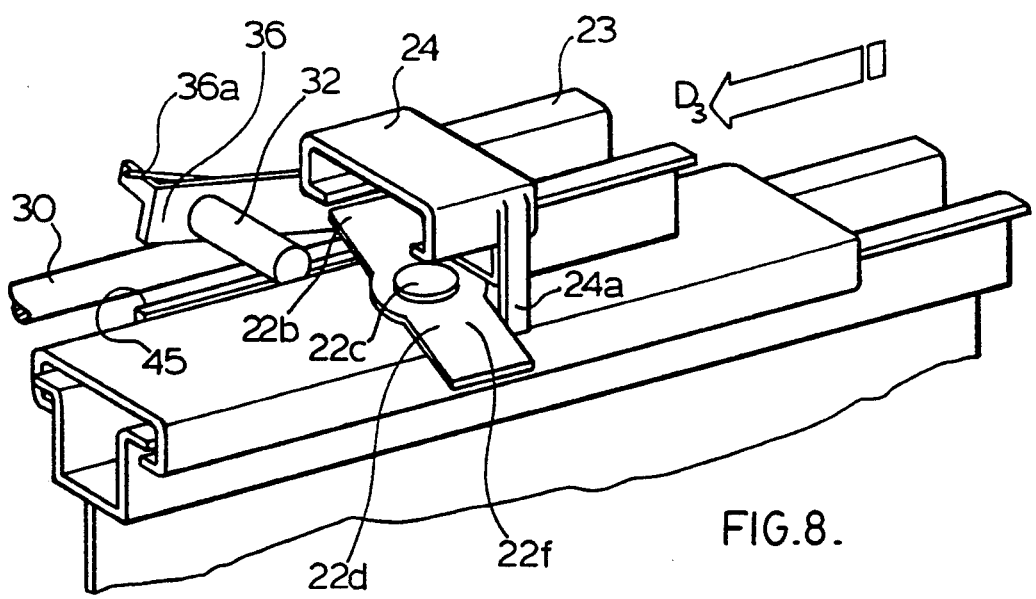

However as best seen in FIG. 6, when the appendage 24a of the moveable track moves to a fully forward position, via the appendage 24a proximate the rear of the moveable track 24 engages the release mechanism 22f at the end 22d thereof causing the release mechanism to rotate in a direction D4 as best seen in relation to FIG. 7 in rotating in a direction D4 the end 22b of the release mechanism 22f abuts the tail portion 45a which extends upwardly away from the slideable pawl portion 45 causing the slideable pawl portion 45 to slide rearwardly in relation to the pivotable pawl portion 46. The pawl portion 45 is free to slide in relation to the pawl portion 46 because of the pin 46g extending through the opening 45f which is generally longitudinal. In sliding rearwardly the pawl 45 retains the pin 32 within its opening 45d however, the forward portion 46e of the recess 46d presents a cam surface. Therefore, as the pawl 45 slides rearwardly the pin 32 rides up on the cam surface 45e until such time as the pin reaches the top of the pawl 45. Because of the supplementary member to which the pin 32 is attached is pivotable at end 37, the pin may lift out of the recess 42 along the cam surface 45e to move laterally away from the initial locking position of the pin 32 with the appendage 45b of the slideable pawl 45. In the position therefore of FIG. 7, the pin and the handle and the moveable rail 22 affixed to the lower rail 21 is free to move to easy entry position as the pin rides along the top of the pawl and matching mechanism 40. The handle moves along with the moveable track 22 because as best seen in FIG. 2 it is affixed thereto by supplementary member 8a. However, as best seen in relation to FIG. 7 the comfort pawl 46 still remains engaged with the latching plated 50. Even if the handle were moved since the pin 32 is removed from the recess 42 nothing will engage and therefore the comfort setting is established by a mechanical memory, so that when the pin returns to the recess 42 the comfort position will be in a exactly the same location. After reaching the easy entry position the seat may be returned as urged by the occupant to its comfort setting as best observed in relation to FIG. 9, wherein the seat is moved by the operator in a direction D2 until such time as the pin enters the recess 42 whereat the reversed action occurs. The top moveable track 24 will move back first in relation to the top fixed track 23. It will continue to move back as urged by the operator until such time as the appendage 24a no longer engages the release mechanism 22f whereat the pawl 45 will move forward to capture the pin 32 in the recess 42 of the pin 32 dropping back into the recess 42 along the cam surface 45e when it is returned to that position, and thereafter being locked in its initial position. At this position the comfort setting is identical since it has not moved in relation to the lower moveable track 22.

Figure 10:
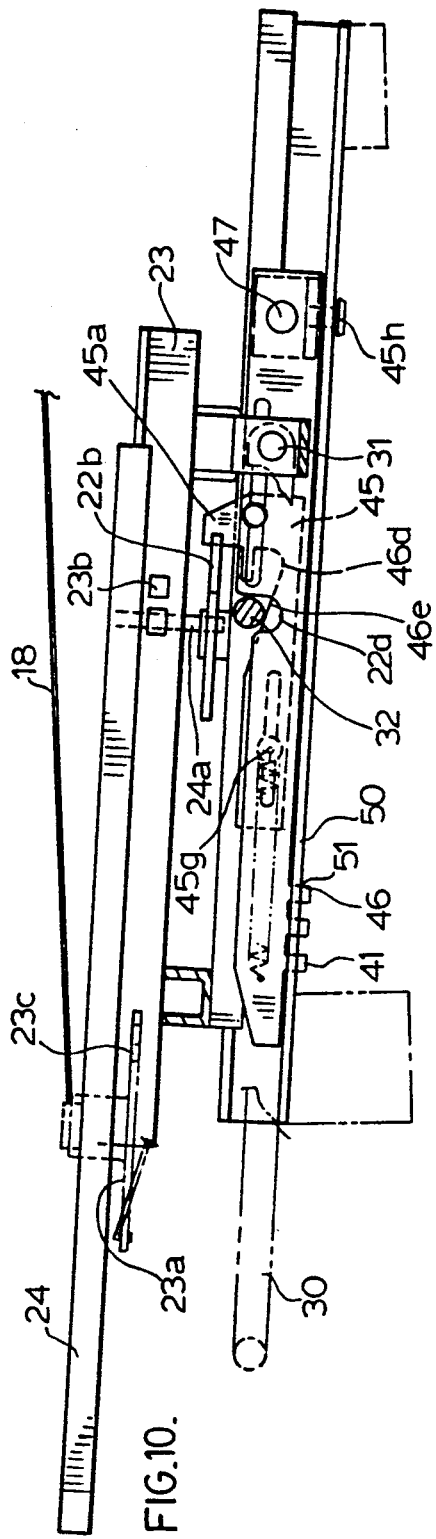
FIGS. 10 and 11 are views similar to that of FIGS. 3 and 4 illustrated and be release mechanism of the seat track assembly illustrated in a preferred embodiment of the invention.
Figure 11:
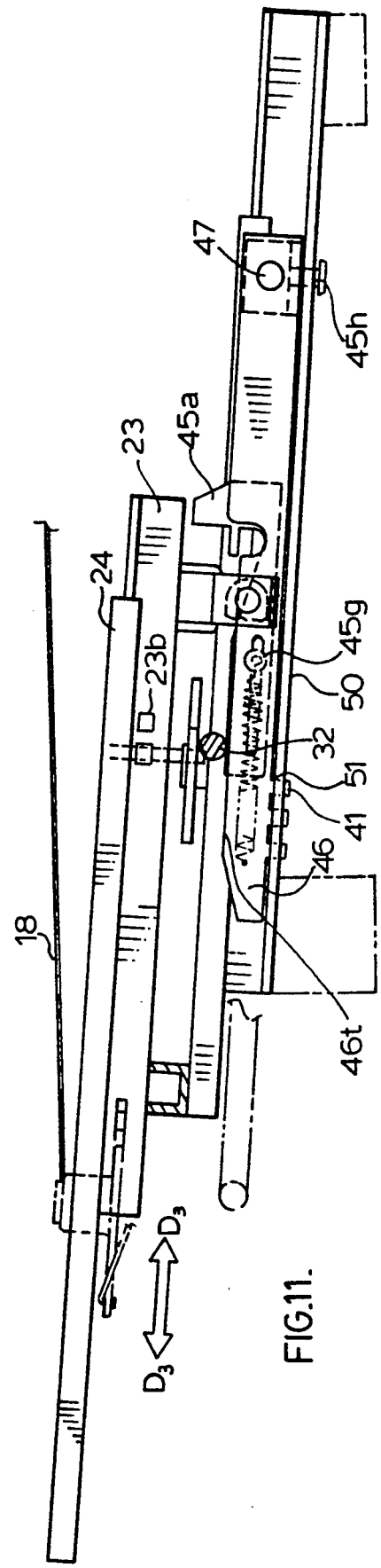
Figure 12:
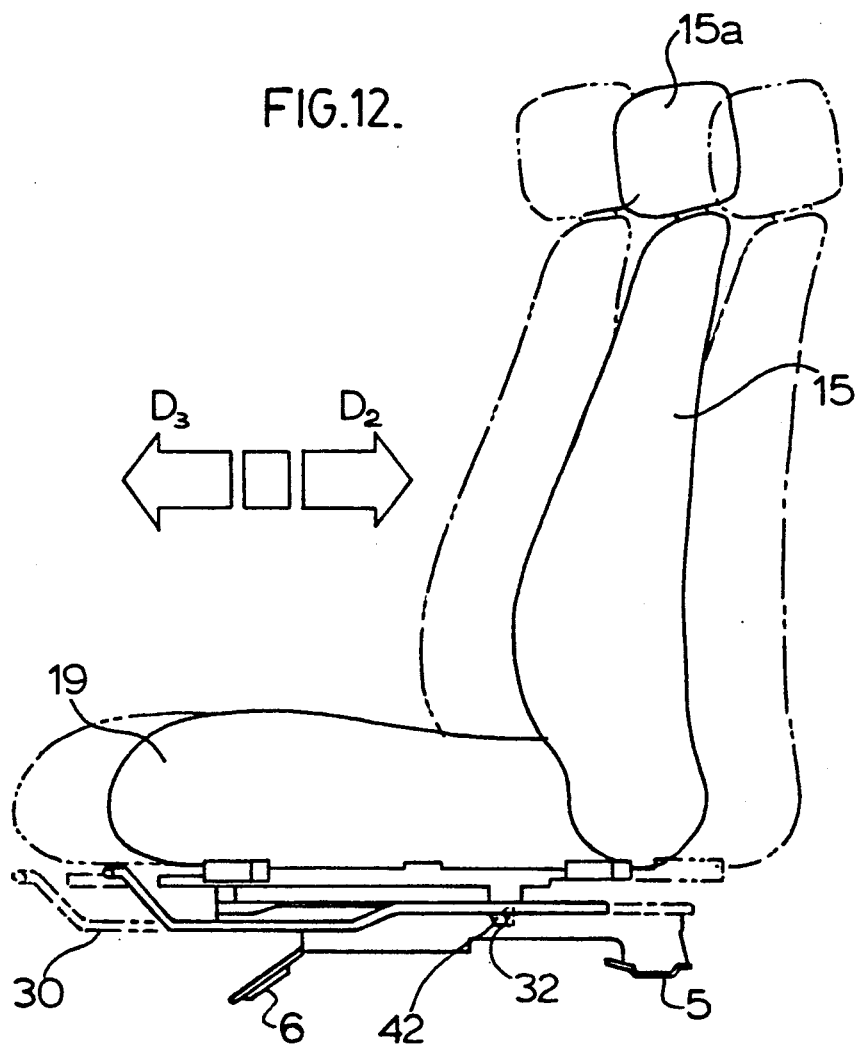

The sequence of the events can best be seen in a relation to FIGS. 10 and 11 whereat the appendage 24a of the upper moveable track engages the release pawl 22f at end 22d which causes engagement of the end 22b with the tail portion 45a of the slideable pawl 45 which causes the slideable pawl to move rearwardly in relation to the comfort pawl 46, whereat the pin 32 rides along the cam surface 46e until such time it is lifted from the recess 42. The release of the pin 32 from the recess 42 also release the lower moveable track 42 from a movement in relation to a lower fixed track 21. The lower fixed track is biased towards the front of the seat and therefore continues to move to its full extend along with the handle portion now disengaged from the latching mechanism 40 by pin 32 while retaining the comfort pawl 46 within the detents 51 of the latching plate 50. The pin 32 therefore rides along the top of the latch mechanism 40 and allows movement of the seat to the full easy entry position of the seat track wherein the top moveable rail has moved a total of 7 inches and the bottom moveable rail had moved a sufficient distance to allow a further 7 inches of travel to the easy entry position.

Referring now to FIGS. 12 through 17 there is provided a sequence of movement for the seat track assembly of the easy entry mechanism. The seat is moveable in directions D3 and D2 as best seen in relation to FIG. 12. When the handle 30 therefore is lifted is previously described the latch mechanism 40 may be established in position in relation to the latch plate 50 therefore allowing the user to establish comfort settings for the seat 19. However, when the seat back D5 is pivoted a chain of events occurs as described previously, which initially release the upper and moveable rail 24 from the upper fixed rail 23 this upper moveable 24 will move fully forwardly being biased in that direction until such time as the appendage 24a engages the release mechanism 22f which releases the pin 32 from the recess 42 of the latching mechanism 40. In doing so, the lower moveable rail 22 and the upper fixed rail 23 therefore are free to move in relation to the fixed rail 21 as best seen in relation to FIG. 15 wherein the pin 32 is release from the recess 42 as the seat travels in a direction D3 therefore releasing the lower moveable rail 24 in relation to the lower fixed rail 21. The handle mechanism 30 travel therewith. Therefore a space s is provided for the easy entry of the occupants of the rear seat. After the occupants have entered the rear seat, the seat is moved rearwardly in a direction D2 until such time as the pin 32 engages the recess 42 as best seen in FIG. 17, whereat the seat is return to it pre set comfort position, having retained the comfort position in memory, mechanically. The seat may be returned to the comfort position by pushing back on the seat 19 with the seat back in position P1 or moved in the direction D6 to the position P2. Either position is acceptable and will not interfere with the re latching of the seat in the comfort position.

The invention therefore has been illustrated in a preferred embodiment thereof as an easy entry seat having a full 14 inches of motion to allow easy entry to the rear seats of the vehicle as best seen in FIG. 15. It is also considered embodiment of this invention in alternated form to provide only 7 inches of movement of the easy entry seat assembly, wherein the upper moveable track 24 and the upper fixed track 23 are not provided. The portion 18 and 17 are fixed to the seat back therefore will be engageable with the release mechanism 22f. Otherwise the operation of the latching mechanism will be identical.

Some of the unique features of the seat are:

1. A common handle accessing the latch mechanism of the in board and out board sides for the track assembly;

2. A compound latch mechanism that is releasably engageable with the handle to allow the handle to move with the seat track, and releasably securable with the latching plate having the multiplicity of openings which allows setting of the memory and comfort position for the seat.

3. For the preferred embodiment the appendage from the upper moveable rail is important. It allows the whole assembly to automatically work by releasing the rotatable pawl.

4. Each individual latch of the seat track assembly may engage even if the other side doesn't because of for example the jamming of one side (for example having a pop can jammed thereat). Also both pins may not always align with the recess for the latching mechanism,(by similar jamming) therefore a safety feature has been provided.

In alternative embodiments the upper tracks may not be presented. The whole assembly may work just as well with some modification. The rotatable pawl may then be activated by the pivoting seat back.

Therefore the track movement may be 7 inches or 14 inches depending an whether a double or single track assembly is provided.

One of the advantages of the invention is the independent latching of the pins 32 of the supplementary handle portion 36 with respect to the recesses 42 of the latch mechanism 40. Both the inboard and the outboard latches 40 of the track assembly independently latch the pin 32 of each supplementary handle portion 36. The handle portion 30 and each supplementary handle portion 36 pivot at a common pivot 31 as best seen in FIG. 2. A detent portion 36a) is provided with the supplementary portion 36 to engage the upper surface of the handle portion 31a) when the occupant readjusts the comfort position. Therefore as long as pin 32 remains in the recess, the handle 30 and the supplementary portion 36 move together.

However when the pin 32 is released from the recess 42, as described above in relation to the movement of the seat to the easy entry position, the supplementary portion 36 is free to pivot separately from the handle 30. This separate pivoting motion of the supplementary portion 36 allows the pin 32 to disengage and reengage the recess 42 of the latch mechanism 40 as previously described, independently of the handle on the outboard and inboard sides of the track assembly 20. This independent motion provides independent inboard and outboard latching of the pin 32 with the latch mechanism 40. This feature is beneficial if a pop can or other obstruction were jammed under one of the latches 40, the other latch 40 would be free to engage pin 32. Providing the supplementary portion provides this feature.

It is recommended that the latching plate 50 and the latches be manufactured from high strength alloy steel to ensure that the structures successfully meet the United States Federal Motor Vehicle Safety Standard 208. The balance of the assembly is manufactured from low carbon steel.

As many changes can be made to the invention without departing from the scope of the invention, it is intended that all material contained herein by interpreted as illustrative of the invention and not in a limiting sense.

The embodiments of the invention in which an exclusive property or privilege is claimed are as follows:

1. An easy entry seat track assembly with integral comfort and mechanical memory for a vehicle seat having a pivotable seat back, the seat having an inboard and outboard side, a front and a rear, the seat track assembly comprising proximate the inboard and outboard sides, a fixed lower rail fixed to the frame of a vehicle and extending from proximate the front to proximate the rear of the seat, a latching plate fixed to the frame of the vehicle and extending from proximate the front to proximate the rear of the seat, each latching plate having a multiplicity of juxtaposed detent portions extending from proximate the front to proximate the rear of the seat, each fixed rail having a moveable rail mounted therewith for movement thereof from rear to front of the seat to the easy entry position when free to do so, each moveable rail carrying release means for automatically disengaging each moveable rail from each fixed rail when the seat back is pivoted each latching plate having a slot extending from proximate the front to proximate the rear of the seat and extending adjacent the multiplicity of detent portions, each latching plate having latching means therewith having first and second detent means, each latching means being releasably moveable in the slot of the latching plate and moveable from a position wherein the first detent means of each latching means engages the detent means of each latching plate, to a position wherein the first detent means of each latching means disengages the detent means of each latching plate whereat each latching means is free to slide within the slot of each latching plate to a new comfort position and memory position and thereat reengage the first detent means of each latching means with the detent means of each latching plate, the inboard and outboard moveable rails having secured therewith handle means, the handle means being accessible to a seat occupant and simultaneously engaging the inboard and outboard track assembly and each latching means thereof, the handle means including detent means for detachably engaging the second detent means of each latching means when the first detent means of each latching means engages the detent means of each latching plate and when the seat is latched and not moveable, including a supplementary handle portion included with the detent means which preferably pivots on the same pivot as the handle means, thereby providing independent latching of the inboard and outboard latching means and moveable by the occupant to disengage the first detent means of each latching means from the detent means of each latching plate and allowing movement of each latching means in the slot of each latching plate to establish a new comfort setting and memory position whereat the first detent means of each latching means engages different juxtaposed detent means of each latching plate, the detent means of the handle means being automatically disengagable from the second detent means of each latching means when the seat back is pivoted and the release means is actuated, whereby the detent means of the handle means disengages from the second detent means of each latching means thereby releasing the handle means and each moveable rail from each latching means and each fixed rail and thus allowing forward motion of the seat, whereat the first detent means of each latching means remains engaged with the detent means of each latching plate to retain the comfort setting of the seat during movement of the seat track assembly when the seat is moved to the easy entry position, whereby when the seat track is returned to the comfort position from the easy entry position by the seat occupant, as each moveable track moves to the rear the detent means of the handle means reengages the second detent means of the latching means to latch the handle means and each moveable rail with respect to each latching means and each fixed rail without changing the comfort setting of each latching means with each latching plate.

2. The track assembly of claim 1 wherein a common assembly is provided for installation of the latching plate and the fixed lower rail to the frame.

3. The track assembly of claim 1 wherein the multiplicity of juxtaposed detent portions of the latching plate are openings.

4. The track assembly of claim 1 wherein second detent means of the latching means is an opening.

5. The track assembly of claim 1 wherein each latching means is releasably slidable in the slot with the latching plate.

6. The track assembly of claim 1 wherein each latching means is pivotable from a position wherein the first detent means of each latching means engages the detent means of each latching plate.

7. The track assembly of claim 6 wherein each latching means is pivotable from a position wherein the first detent means of each latching means engages the detent means of each latching plate, to a position whereat the first detent means of each latching means disengages the detent means of each latching plate.

8. The track assembly of claim 1 wherein the handle means is pivotally secured with each moveable rail, and moveable upwardly away from the rail.

9. The track assembly of claim 1 wherein said detent means of the handle means is a pin.

10. The seat track assembly of claim 1 further comprising a second fixed rail fastened with and preferably above each moveable rail disposed proximate the inboard and outboard sides of the seat, each second fixed rail having a second moveable rail mounted therewith for movement thereof from rear to front of the seat to the easy entry position when free to do so, each second moveable rail carrying a latching mechanism actuated by the forward pivoting of the seat back to disengage each second moveable rail from each second fixed rail and to allow movement of each second moveable rail towards the front of the seat, each second moveable rail including third release means to engage each release means for the detent means of the handle means, the detent means of the handle means being automatically disengagable from the second detent means of each latching means when each second moveable rail moves to proximate its fully forward position whereat the third release means of each second moveable rail engages the release means for the detent means of the handle means thereby releasing the handle means and each moveable rail from each latching means and each fixed rail and thus allowing forward motion of the seat to the easy entry position.

11. The track assembly of claim 10 wherein the second release means is an appendage extending away from each second moveable rail.

12. An easy entry seat track assembly with integral comfort and mechanical memory for a vehicle seat having a pivotable seat back, the seat having an inboard and outboard side, a front and a rear, the seat track assembly comprising proximate the inboard and outboard sides, a fixed lower rail fixed to the frame of a vehicle and extending from proximate the front to proximate the rear of the seat, a latching plate fixed to the frame of the vehicle and extending from proximate the front to proximate the rear of the seat, each latching plate having a multiplicity of juxtaposed openings, each plate extending from proximate the front to proximate the rear of the seat, each fixed rail having a moveable rail releasably mounted therewith for movement thereof from rear to front of the seat to the easy entry position when free to do so, each moveable rail being automatically disengaged from the fixed rail when the seat back is pivoted, the pivoting of the seat back actuating a release mechanism with the track assembly to allow movement of each moveable rail, each latching plate having a slot extending from proximate the front to proximate the rear of the seat and extending adjacent the multiplicity of openings, each latching plate having a latching mechanism slidably engaged with the slot of the latching plate and pivotally attached proximate its end to the latching plate, a supplementary latch portion which engages the slot of the latching plate and being slideable therein is provided with the latch mechanism, each latching mechanism including first and second portions extending generally away from the juxtaposed openings of the latching plate, each first portion of each latching mechanism having disposed proximate one side thereof a multiplicity of teeth for engaging the juxtaposed openings of each latching plate and thus when engaged defining the comfort and memory of the seat track assembly, each first portion having a first recess disposed at the side of each first portion remote the teeth, each second portion of each latching mechanism being resiliently biased towards the front of the seat, and being fastened with the first portion and slideable in relation thereto, the first portion and the supplementary portion being slidably retained in the slot of each latching plate, and being pivotable at the end, each second portion including a second recess, the second recess of each second portion including a cam surface proximate the front of the second recess and a detent proximate the rear of the second recess, the detent for engagement with the release mechanism of the track assembly, a locking appendage is provided with the second portion proximate the rear of the second recess and extending partially over the second recess towards the cam surface of the second portion, each latching mechanism being releasably slidable in the slot and slideable with the supplementary portion with the latching plate and pivotable from a position wherein the teeth of each latching mechanism engage the openings of each latching plate, to a position wherein the teeth of each latching mechanism disengage the openings of each latching plate whereat each latching mechanism is free to slide within the slot of each latching plate to a new comfort position and memory and thereat reengage the teeth of each latching mechanism with the openings of each latching plate, the inboard and outboard moveable rails having secured therewith a handle and being accessible to a seat occupant, the handle simultaneously engaging each inboard and outboard track assembly and each latching mechanisms thereof by a supplementary handle portion pivotable with the handle for disengaging the comfort setting, the handle being pivotally secured with each moveable rail, and pivotable upwardly away from the rail by the occupant to disengage the teeth of each latching mechanism from the openings of each latching plate, the supplementary handle portion having disposed therewith a pin proximate each latching mechanism for detachably engaging the first and second recess of the first and second portions of each latching mechanism when the teeth of each latching mechanism engages the openings of each latching plate and when the seat is latched and not moveable, each pin of the handle being automatically disengagable from the first and second recesses of the first and second portions of each latching mechanism when the seat back is pivoted actuating the release mechanism which engages the detent of the second portion of each latching mechanism, the supplementary handle portion being separately pivotable when the pin reengages the first and second recess of the latching mechanism thus providing independent inboard and outboard latching, whereby each pin of the handle disengages the first and second recesses of each latching mechanism, each pin of the handle being urged to leave the first and second recesses of the portions of each latching mechanism by the cam surface of the second portion of the latching mechanism as these second portion moves rearwardly, actuated by the release mechanism of the track assembly, thereby lifting each pin from the first and second recesses and simultaneously moving the locking appendage of the second portion rearwardly away from the locking the pin in the first and second recesses, whereat the handle and each moveable rail are disengaged from each latching mechanism and the fixed rail and thus allows forward motion of the seat, the teeth of each latching mechanism remaining engaged with the openings of each latching plate to retain the comfort setting of the seat during movement of the seat track assembly when the seat is moved to the easy entry position, whereby when the seat track is returned to the comfort position from the easy entry position by the seat occupant, as each moveable track moves to the rear each pin of the handle and of the supplementary handle portion, reengages the first and second recesses of each latching mechanism as the release mechanism disengages the detent of the second portion and urges the second portion rearwardly to latch each pin of the handle with the locking appendage of the second portion of each latching mechanism thereby latching the handle and each moveable rail with respect to each latching mechanism and each fixed rail without changing the comfort setting of each latching mechanism with each latching plate.

13. The seat track assembly of claim 12 wherein a common assembly is provided for the installation of the latching plate and the fixed lower rail to the frame.

14. The seat track assembly of claim 12 wherein each latching plate extends substantially horizontally.

15. The seat track assembly of claim 14 wherein the openings of each latching plate extend substantially vertically.

16. The seat track assembly of claim 12 wherein the openings of each latching plate extend substantially vertically.

17. The seat track assembly of claim 12 wherein the recess of the second portion of the latching mechanism tapers forwardly and upwardly away from the bottom of the recess.

18. The seat track assembly of claim 12 wherein the handle is generally U shaped.

19. The seat track assembly of claim 18 further comprising a second fixed rail fastened with and preferably above each moveable rail disposed proximate the inboard and outboard sides of the seat, each second fixed rail having a second moveable rail mounted therewith for movement thereof from rear to front of the seat to the easy entry position when free to do so, each second moveable rail carrying a pawl mechanism actuated by the forward pivoting of the seat back to disengage each second moveable rail from each second fixed rail and to allow movement 20. The seat track assembly of claim 19 wherein the second release mechanism is an appendage extending away from each second moveable rail.

21. The seat track assembly of claim 12 further comprising a second fixed rail fastened with and preferably above each moveable rail disposed proximate the inboard and outboard sides of the seat, each second fixed rail having a second moveable rail mounted therewith for movement thereof from rear to front of the seat to the easy entry position when free to do so, each second moveable rail carrying a pawl mechanism actuated by the forward pivoting of the seat back to disengage each second moveable rail from each second fixed rail and to allow movement of each second moveable rail towards the front of the seat, each second moveable rail including a second release mechanism to engage each release mechanism for each pin of the handle, each pin of the handle being automatically disengagable from the recesses of each latching mechanism when each second moveable rail moves to proximate its fully forward position whereat the second release mechanism of each second moveable rail engages the release mechanism for each pin of the handle thereby releasing the handle and each moveable rail from each latching mechanism and each fixed rail and thus allowing forward motion of the seat to the easy entry position.

22. The seat track assembly of claim 21 wherein the second release mechanism is an appendage extending away from each second moveable rail.

23. The seat track assembly of claim 12 wherein each supplementary handle portion of the seat track assembly, is pivotable at each of the inboard and outboard sides of the track assembly on a common pivot with the handle, each supplementary portion including a detent to engage the handle when the handle is moved upwardly away from the track assembly to readjust the comfort position and the pin is retained in the recess of the latching mechanism yet when the pin leaves the recess of the latching mechanism when the seat moves to the easy entry position, each supplementary portion is separately pivotable allowing the pin to leave the recess and to reengage the recess independently of the handle thereby providing independent latching at both the inboard and outboard sides of the seat track assembly.

24. For use with an easy entry seat track assembly with integral comfort and mechanical memory for a vehicle seat having a pivotable seat back, a mechanical memory and comfort adjustment mechanism.

the seat having an inboard and outboard side, a front and a rear, the seat track assembly having proximate the inboard and outboard sides, a fixed lower rail fixed to the frame of a vehicle and extending from proximate the front to proximate the rear of the seat, a latching plate fixed to the frame of the vehicle and extending from proximate the front to proximate the rear of the seat, the latching plate having a multiplicity of juxtaposed openings, the plate extending from proximate the front to proximate the rear of the seat, the fixed rail having a moveable rail releasably mounted therewith for movement thereof from rear to front of the seat to the easy entry position when free to do so, the moveable rail being automatically disengaged from the fixed rail when the seat back is pivoted, the pivoting of the seat back actuating a release mechanism with the track assembly to allow movement of each moveable rail, each latching plate having a slot extending from proximate the front to proximate the rear of the seat and extending adjacent the multiplicity of openings, the mechanical memory and comfort adjustment mechanism comprising a latching mechanism slidably engaged with the slot of the latching plate and pivotally attached proximate it end to the latching plate, a supplementary latch portion is provided which engages the slot of the latching plate being slidable therein, the latching mechanism including first and second portions extending generally away from the juxtaposed openings of the latching plate, the first portion of each latching mechanism having disposed proximate one side thereof a multiplicity of teeth for engaging the juxtaposed openings of the latching plate and thus when engaged defining the comfort and memory of the seat track assembly, the first portion having a first recess disposed at the side of each first portion remote the teeth, the second portion of the latching mechanism being resiliently biased towards the front of the seat, and being fastened with the first portion and slideable in relation thereto, the first portion and the supplementary portion being slidably retained in the slot of the latching plate, and being pivotable at the end the second portion including a second recess, the second recess of the second portion including a cam surface proximate the front of the second recess, and a detent proximate the rear of the second recess, the detent for engagement with the release mechanism of the track assembly, a locking appendage is provided with the second portion proximate the rear of the second recess and extending partially over the second recess towards the cam surface of the first portion, the latching mechanism being releasably slidable in the slot with the latching plate and slideable with the supplementary portion and pivotable from a position wherein the teeth of the latching mechanism engage the openings of the latching plate, to a position wherein the teeth of the latching mechanism disengage the openings of the latching plate whereat the latching mechanism is free to slide within the slot of the latching plate to a new comfort position and memory and thereat reengage the teeth of the latching mechanism with the openings of the latching plate, the moveable rail having secured therewith a handle and being accessible to a seat occupant, the handle simultaneously engaging the moveable rail and the latching mechanisms by a supplementary handle portion pivotable with the handle for disengaging the comfort setting, the handle being pivotally secured with the moveable rail, and pivotable upwardly away from the rail by the occupant to disengage the teeth of the latching mechanism from the openings of the latching plate, the supplementary handle portion having disposed therewith a pin proximate the latching mechanism for detachably engaging the first and second recesses of the first and second portions of the latching mechanism when the teeth of the latching mechanism engages the openings of the latching plate and when the seat is latched and not moveable, the pin of the handle being automatically disengagable from the first and second recesses of the first and second portions of the latching mechanism when the seat back is pivoted actuating the release mechanism which engages the detent of the second portion of the latching mechanism, the supplementary handle portion being separately pivotable when the pin reengages the first and second recess of the latching mechanism thus providing independent inboard and outboard latching, whereby the pin of the handle disengages the first and second recesses of the latching mechanism, the pin of the handle being urged to leave the first and second recesses of the portions of the latching mechanism by the cam surface of the second portion of the latching mechanism as the second portion moves rearwardly, actuated by the release mechanism of the track assembly, thereby lifting the pin from the first and second recesses and simultaneously moving the locking appendage of the second portion rearwardly away from locking the pin in the first and second recesses, whereat the handle and the moveable rail are disengaged from the latching mechanism and the fixed rail and thus allows forward motion of the seat, the teeth of the latching mechanism remaining engaged with the openings of the latching plate to retain the comfort setting of the seat during movement of the seat track assembly when the seat is moved to the easy entry position, whereby when the seat track is returned to the comfort position from the easy entry position by the seat occupant, as the moveable track moves to the rear, the pin of the handle and of the supplementary handle portion, reengages the recesses of the latching mechanism as the release mechanism disengages the detent of the second portion and urges the second portion rearwardly to latch the pin of the handle with the locking appendage of the second portion of the latching mechanism thereby latching the handle and the moveable rail with respect to the latching mechanism and the fixed rail without changing the comfort setting of the latching mechanism with the latching plate.

25. The mechanical memory latching mechanism of claim 24 wherein each supplementary handle portion of the mechanical latching mechanism is pivotable at each of the inboard and outboard sides of the track assembly on a common pivot with the handle, each supplementary portion including a detent to engage the handle when the handle is moved upwardly away from the track assembly to readjust the comfort position and the pin is retained in the recess of the latching mechanism yet when the pin leaves the recess of the latching mechanism when the seat moves to the easy entry position, each supplementary portion is separately pivotable allowing the pin to leave the recess and to reengage the recess independently of the handle thereby providing independent latching at both the inboard and outboard sides of the seat track assembly.

* * * * *